United States Patent
Tredwell

(10) Patent No.: US 8,558,929 B2
(45) Date of Patent: Oct. 15, 2013

(54) IMAGING ARRAY FOR MULTIPLE FRAME CAPTURE

(75) Inventor: Timothy J. Tredwell, Fairport, NY (US)

(73) Assignee: Carestream Health, Inc., Rochester, NY (US)

( * ) Notice: Subject to any disclaimer, the term of this patent is extended or adjusted under 35 U.S.C. 154(b) by 1175 days.

(21) Appl. No.: 11/613,394

(22) Filed: Dec. 20, 2006

(65) Prior Publication Data

US 2008/0149843 A1 Jun. 26, 2008

(51) Int. Cl.
*H04N 3/14* (2006.01)
*G01T 1/24* (2006.01)

(52) U.S. Cl.
USPC ...................................... 348/294; 250/370.09

(58) Field of Classification Search
USPC ............. 348/308, 50, 77, 162, 302, 294, 300, 348/301, 303, 304, 307, 311, 305, 221.1, 348/243; 250/307.09
See application file for complete search history.

(56) References Cited

U.S. PATENT DOCUMENTS

| | | | | |
|---|---|---|---|---|
| 5,198,673 A | * | 3/1993 | Rougeot et al. | 250/370.11 |
| 6,078,037 A | * | 6/2000 | Booth, Jr. | 250/208.1 |
| 6,215,113 B1 | * | 4/2001 | Chen et al. | 250/208.1 |
| 6,243,134 B1 | * | 6/2001 | Beiley | 348/308 |
| 6,317,154 B2 | * | 11/2001 | Beiley | 348/308 |
| 6,408,054 B1 | * | 6/2002 | Rahn et al. | 378/154 |
| 6,429,436 B1 | | 8/2002 | Tomisaki et al. | |
| 6,862,364 B1 | * | 3/2005 | Berestov | 382/132 |
| 7,170,041 B2 | * | 1/2007 | Rahn | 250/208.1 |
| 2003/0076431 A1 | * | 4/2003 | Krymski | 348/308 |
| 2005/0018065 A1 | | 1/2005 | Tashiro et al. | |
| 2005/0157194 A1 | * | 7/2005 | Altice | 348/308 |
| 2005/0173645 A1 | | 8/2005 | Endo | |

FOREIGN PATENT DOCUMENTS

| | | |
|---|---|---|
| EP | 0 777 379 A1 | 6/1997 |
| WO | WO 99/54912 | 10/1999 |
| WO | WO 00/05874 | 2/2000 |

* cited by examiner

*Primary Examiner* — Tuan Ho
*Assistant Examiner* — Ahmed A Berhan

(57) ABSTRACT

An imaging array has a plurality of pixel sites (22), each having a photosensing element (24) providing a variable signal in response to incident radiation. A first frame storage circuit (46a) is electrically coupled to the photosensing element and has a first charge storage element for storing a first photosensing element signal and a first switching element (26) to switch the photosensing element to the first frame storage circuit. A second switching element (26) switches the first charge storage element (32) for reading the signal stored. A second frame storage circuit (46b) is electrically coupled to the photosensing element and has a second charge storage element for storing a second signal. A third switching element (26) switches the photosensing element to the second frame storage circuit. A fourth switching element (26) switches the second charge storage element for reading the signal stored.

24 Claims, 14 Drawing Sheets

IMAGING ARRAY FOR MULTIPLE FRAME CAPTURE

CROSS REFERENCE TO RELATED APPLICATIONS

Reference is made to commonly-assigned copending U.S. patent application Ser. No. 11/487,539, filed Jul. 14, 2006, entitled APPARATUS FOR ASYMMETRIC DUAL-SCREEN DIGITAL RADIOGRAPHY by Yorkston et al., the disclosure of which is incorporated herein.

FIELD OF THE INVENTION

This invention generally relates to radiographic imaging and more particularly relates to an imaging array apparatus for providing multiple radiographic images with reduced noise.

BACKGROUND OF THE INVENTION

Digital radiography (DR) systems are enjoying growing acceptance in medicine and industry, with particular value as clinical imaging tools. As shown in the simplified block diagram of FIG. 1, radiation from a radiation source 12 in a DR imaging apparatus 10 is passed through a subject 14 and impinges upon a radiation detector 30 that includes a scintillator screen 16 for converting the energy from ionized radiation into light radiation having a different frequency, typically within the visible spectrum, and an image sensing array 20. Image sensing array 20, typically mounted on the backplane of scintillator screen 16 or otherwise optically coupled with scintillator screen 16, then forms a digital image from the emitted light that is excited by the incident radiation. The digital image thus formed can then be processed and displayed by an image processing apparatus on a control logic processor 18, typically provided by a computer workstation and display monitor.

Unlike conventional X-ray film apparatus, DR imaging apparatus 10 does not require a separate processing area, light-protected environment, or image processing consumables. Another advantage of DR imaging technology is speed, since images are obtained immediately after the X-ray exposure. For medical applications, this means that a diagnostic image can be provided to medical personnel while a patient is still present at an imaging facility.

Image sensing arrays 20 for radiographic applications typically consist of pixel sites, commonly referred to as pixels, each pixel having a photo-activated image sensing element and a switching element for reading a signal from the image-sensing element. Image sensing can be performed by direct detection, in which case the image-sensing element directly absorbs the X-rays and converts them into charge carriers. However, in most commercial digital radiography systems, indirect detection is used, following the basic arrangement shown in FIG. 1, in which an intermediate scintillator element converts the X-rays to visible-light photons which are then sensed by a light-sensitive image-sensing element.

Examples of image sensing elements used in image sensing arrays 20 include various types of photoelectric conversion devices such as photodiodes (P-N or PIN diodes), photocapacitors (MIS), or photoconductors. Examples of switching elements used for signal read-out include MOS transistors, bipolar transistors and p-n junction components.

FIG. 2 shows an arrangement of components in a conventional image-sensing array 20 used for DR imaging. In one basic embodiment, a pixel 22 consists of at least one photoelectric conversion device or photosensing (PS) element 24, shown as a photodiode in FIG. 2, and at least one switching element 26, shown as a type of transistor switch, $M_{RO}$. Operation of image sensing array 20 consists in the steps of (a) initializing the array of pixels 22, (b) exposing the array to the light radiation excited by X-rays and (c) reading the signal value at each pixel of the array using a multiplexed signal-reading sequence.

As an example of switching element 26, transistor $M_{RO}$ is addressed by a gate line driven by a signal $\Phi_{RO}$. Each data line, in turn, is connected to an external charge amplifier (not shown), as is familiar to one skilled in the imaging electronics art. During signal integration, switch $M_{RO}$ is off and photosensing element 24 integrates the photocurrent generated by external light, with added dark current thermally generated within the photo-sensor. During readout, $M_{RO}$ is switched on, one row at a time, transferring the charge from photosensing element 24 to the data line, where it is sensed by a charge amplifier at the end of the column.

One problem with existing embodiments of image sensing array 20 relates to the amount of time required to obtain an image. Read-out of array 20 can take a full second or longer, due to a number of factors. Each array 20 provides a large amount of data, typically from 3,000×3,000 pixels, each pixel 140 microns square in a typical embodiment. There is a relatively long gate address time and long data settling time for each pixel. At the analog-to-digital data conversion end, high accuracy is required, typically in the range of 14-bit resolution.

Another recognized problem with image sensing array 20 in conventional embodiments relates to a disappointing signal-to-noise ratio. One of the largest noise sources in traditional arrays is photosensor dark current. The dark current within a photosensor can be due to thermal generation of electron-hole pairs or, at high bias voltages, to electric field-induced breakdown. The dark current produces an offset in the pixel signal which frequently must be subtracted from the image through frame-to-frame captures and digital subtraction. Unfortunately, this offset, that varies with the type of photoelectric conversion type used and can vary with integration time, can often be larger than the actual image signal level in radiographs. In addition, the dark current results in noise generated from other sources. These noise sources include quantum noise, 1/f noise or flicker noise and pattern noise.

The dark current shot noise (in electrons) is given by:

$$N = (J_D^*(T_{int} + T_{ro})/q)^{1/2}$$

where $J_D$ is the photosensor dark current, $T_{int}+T_{ro}$ are the signal integration and readout times respectively, and q is the electronic charge. The pattern noise is given by $$N = \alpha^* J_D^*(T_{int}+T_{ro})/q$$

where $\alpha$ is the percentage rms variation in pixel-to-pixel dark current level. The pattern noise is usually subtracted by capturing multiple dark frames before or after the radiographic image capture and digitally subtracting the averaged dark frames from the image frame. This subtraction process adds noise due to digitization and other electronic noise sources.

The 1/f noise is given by:

$$N(f) = (\beta^* J_D^*(T_{int}+T_{ro})^*(f/f_o)/q)^{1/2}$$

Since the readout time is often more than 10 times longer than the light integration time, the dark current and the resulting shot noise, pattern and flicker noise is predominantly generated during the readout. Provision of a low noise storage element in the pixel would allow the signal charge to be stored without being degraded by noise and offset from the pixel.

Some radiographic imaging modalities, such as fluoroscopy or image-guided surgery, require video-rate imaging. For these applications much lower conversion accuracy and higher-speed readout electronics are used, at the price of reduced signal-to-noise (S/N) ratio. Reduced S/N ratio may be acceptable in such cases. However, there are also a number of radiographic modalities, such as multi-energy, CT or cone-beam CT, that require capture of a sequence of images having the best possible resolution and overall image quality. Currently, because of the long readout time of conventional arrays, the sequence used for such imaging requires the patient to be immobile for several seconds while the successive frames are captured and then read out. Inadvertent movement of the patient during imaging would require repetition of the imaging sequence, exposing the patient to increased radiation dosage and requiring additional time and cost.

There have been a number of proposed solutions for reducing the read-out time required for an image sensor array. For example:
- U.S. Pat. No. 6,429,436 (Tomisaki et al.) describes an array panel having photodetectors with signal lines routed on both sides of the panel to reduce parasitic capacitance and allow multiple simultaneous read operations.
- U.S. patent application Publication No. 2005/0173645 (Endo) describes a metal-insulator-semiconductor (MIS) structure having reduced frame-by-frame wait periods.

There have also been solutions proposed for improving signal quality and for overall noise reduction using additional switching and signal storage components. As an example, U.S. patent application Publication No. 2005/0018065 (Tashiro et al.) describes a pixel readout configuration for an image array in which a holding capacitor is switched between a sampled signal and an output line.

While these and similar solutions have been proposed for improving the overall signal quality and response time of an imaging array panel, however, other imaging problems related to signal-to-noise ratio have not been adequately addressed. Dark current noise, which degrades S/N performance, is still a factor with existing solutions. Other problems, such as array panel storage of multiple successive images obtained at near-video rates, have not yet been addressed.

SUMMARY OF THE INVENTION

Briefly, according to one aspect of the present invention, an imaging array comprising a plurality of pixel sites, each pixel site comprises:
a) a photosensing element providing a variable signal in response to incident radiation;
b) a first frame storage circuit electrically coupled to the photosensing element, wherein the first frame storage circuit comprises:
 (i) a first charge storage element for storing, in response to a first incident radiation, a first signal provided by the photosensing element;
 (ii) a first switching element disposed to switch an electrode of the photosensing element to the first frame storage circuit;
 (iii) a second switching element disposed to switch the first charge storage element to a data line for reading the signal stored in the first charge storage element; and
c) a second frame storage circuit electrically coupled to the photosensing element, wherein the second frame storage circuit comprises:
 (i) a second charge storage element for storing, in response to a second incident radiation, a second signal provided by the photosensing element;
 (ii) a third switching element disposed to switch an electrode of the photosensing element to the second frame storage circuit;
 (iii) a fourth switching element disposed to switch the second charge storage element to the data line for reading the signal stored in the second charge storage element.

It is a feature of the present invention that it uses one or more switched storage devices for storage of pixel data.

It is an advantage of the present invention that it allows image data to be obtained from multiple exposures of a digital radiography plate.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

The apparatus of the present invention addresses the need for improved S/N ratio by incorporating a low-noise image storage element in each pixel position of an image-sensing array. This helps to reduce dark current offset and dark current noise by allowing the image charge to be stored in a separately switched storage component for readout.

For the description that follows, the terminology for turning a switch on, or activating a switch, generally refers to forming a closed electrical connection. Turning a switch off or disabling a switch generally corresponds to forming an open electrical connection.

Figure 3:
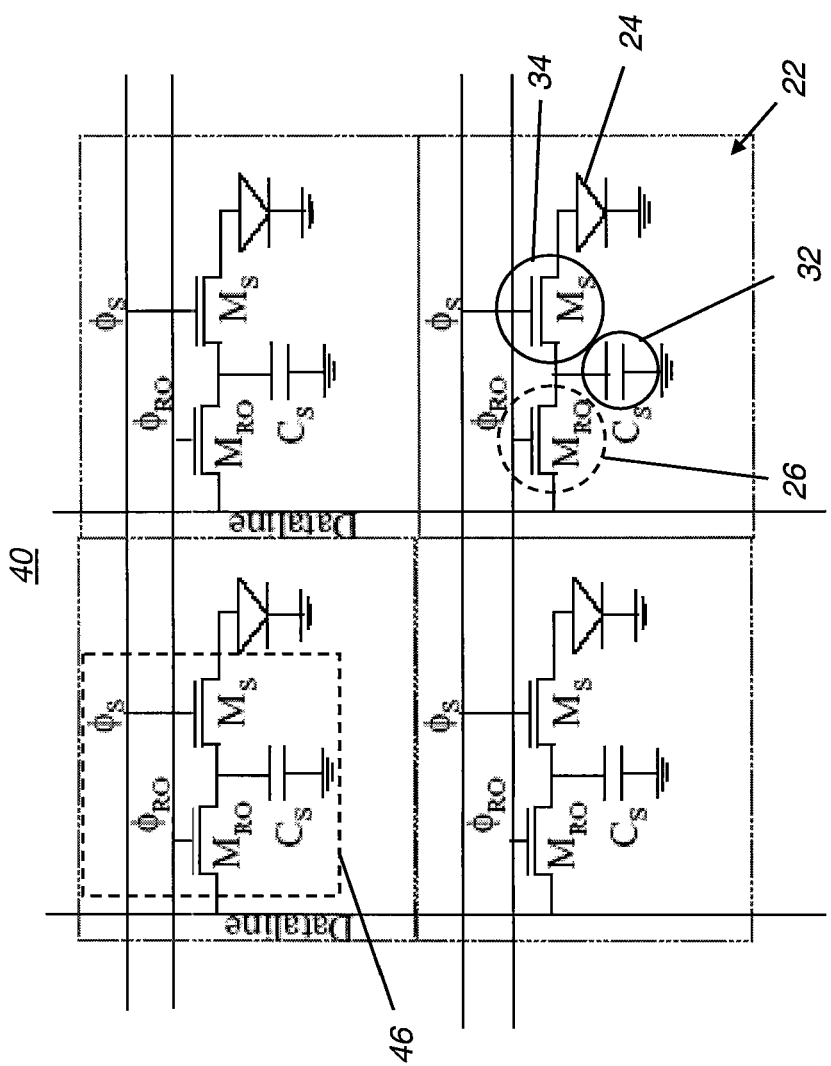
FIG. 3 is a schematic diagram showing pixel components in one embodiment.

One embodiment of representative pixels 22 in an image-sensing array 40 of the present invention is shown in FIG. 3. Here, each pixel 22 has photosensing element 24 provided with a frame storage circuit 46, shown in dotted outline, that has a separate charge storage or signal storage element 32, shown as a capacitor $C_s$ in this embodiment, and an associated switching element 34, shown as a transistor $M_s$.

Operation of components in each pixel 22 for the FIG. 3 embodiment is as follows:

(i) Charge storage. During an exposure time $T_{exp}$, switching element 34 (transistor $M_S$) is turned on and switching element 26 (transistor $M_{RO}$) is turned off. Both the light-induced photocurrent and the dark current from photosensing element 24 are stored by signal storage element 32, here using the parallel capacitance of storage capacitor $C_S$ and innate capacitance of photosensing element 24.

(ii) Signal isolation. Following exposure, switching element 34 (transistor $M_S$) is turned off, isolating signal storage element 32 from photosensing element 24.

(iii) Read-out. The gate-lines driven by a signals $\Phi_{RO}$ then sequentially turn on one row of pixels 22 at a time, transferring the charge from signal storage element 32 to the data lines, where it is sensed by charge amplifiers at the end of the data lines, in a manner familiar to those skilled in the image acquisition arts. The signal readout element thus can consist of the data line, signal amplifiers, and associated switches.

(iv) Reset. Photosensing element 24 is reset. In the photodiode embodiment of FIG. 3, this reset is performed by turning on both switching elements 26 and 34 simultaneously. This reset operation can be performed for multiple pixels simultaneously.

It will be recognized by those skilled in the art that alternative timing sequences can be used in the embodiment of FIG. 3. For example, during the exposure time $T_{exp}$, switching element 34 (transistor $M_S$) can be turned off. Following exposure, switching element 34 (transistor $M_S$) can be turned on for a time period adequate to equalize the electric potential between photosensing element 24 and signal storage element 32, then turned off to isolate signal storage element 32 from photosensing element 24.

The use of switching element 34 to alternately charge, then isolate signal storage element 32 provides a notable difference between the apparatus of the present invention and pixel components conventionally used. A number of conventional devices merely use the inherent capacitance of the photodiode for signal storage or, alternately, employ a capacitor electrically connected in parallel with a photodiode for signal storage.

While the embodiment of FIG. 3 shows use of a photodiode as photosensing element 24, other embodiments are possible with alternative types of photosensors, including photo-capacitors, photo-transistors, and photo-conductors. Other embodiments are also possible with alternative switching elements, including bipolar transistors, diode switches, and CMOS switching gates with NMOS and PMOS transistors in parallel. Additionally, other types of charge storage elements, such as diodes and MOS transistors, may be used.

In the embodiment of FIG. 3, the division of charge between photosensing element 24 and signal storage element 32 may tend to reduce the amount of charge available to be sensed on the data line and may also result in partition noise. An alternative embodiment to counter this effect includes an amplifier between photosensing element 24 and signal storage element 32. This amplifier could use a source follower configuration, with near unity gain, or could be an amplifier with gain.

Thermal noise from the data line is another potential problem. Parasitic capacitance $C_{DL}$ along the data line and the resistance of the data line itself can generate noise, as in:

$$N=(kTC_{DL}/q)^{1/2}$$

where N is the noise in rms electrons, T is the temperature in Kelvin, $C_{DL}$ is the data line capacitance, and g represents a charge value. Active-pixel architectures have been developed for amplification of the charge at the pixel, allowing reduced sensitivity to noise due to external electronics and the data line thermal noise and faster readout. An alternative embodiment of this invention would insert an amplifier in each pixel between the readout transistor $M_{RO}$ switching element 26 and the data line. This amplifier could use a source follower configuration, with near unity gain, or could be an amplifier with gain.

Capture of Multiple Images

Figure 4:
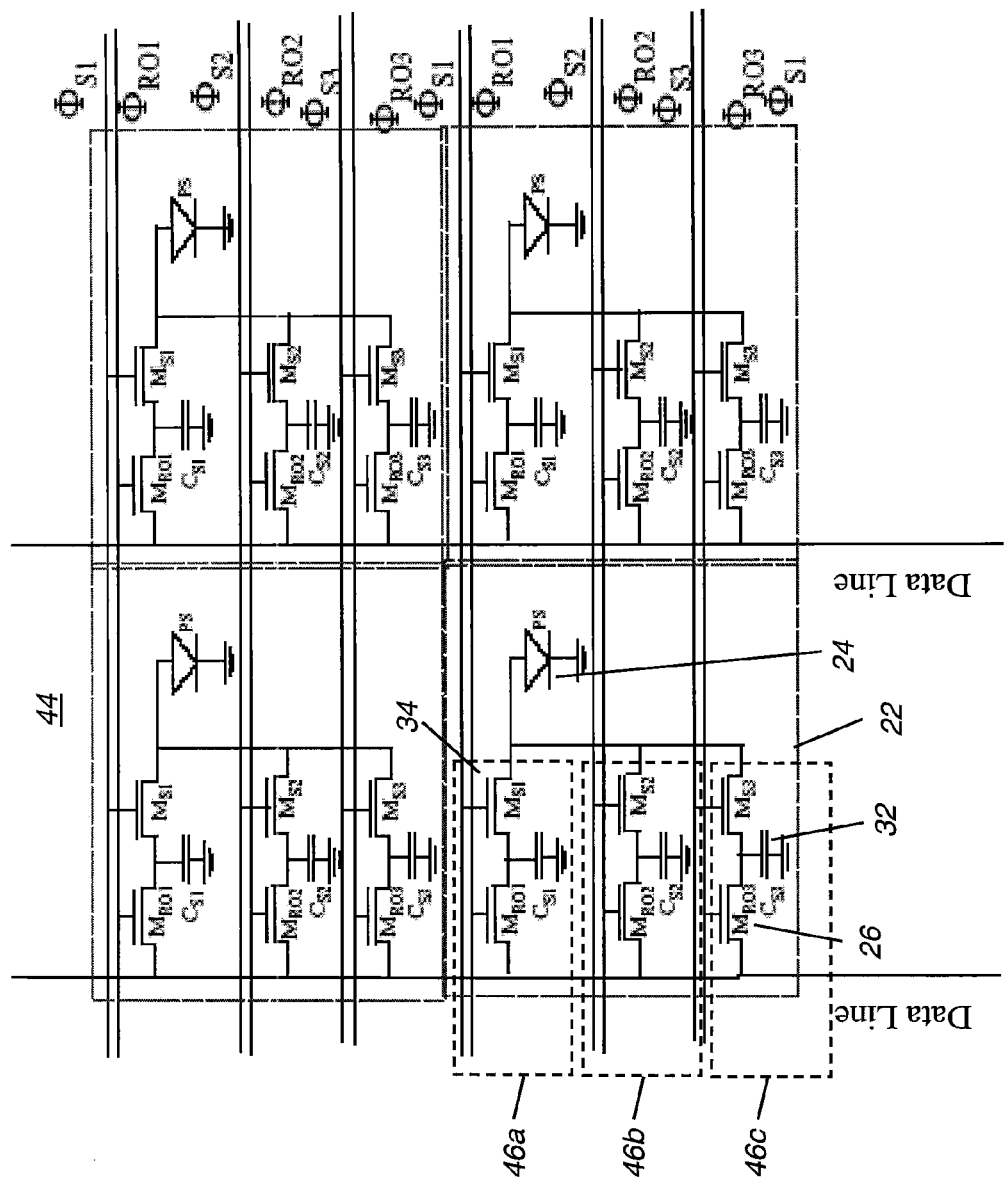
FIG. 4 is a schematic diagram showing pixel components in an embodiment for obtaining multiple image frames.

FIG. 4 shows a schematic for a configuration of pixels 22 in an image-sensing array 44 that can be used for rapid capture of a discrete number of successive image frames and allows read-out of each frame at a rate that is slower than the rate of charge storage for successive frames. With this arrangement, each pixel 22 has a single photosensing element 24 (labeled PS) supported by multiple frame storage circuits 46a, 46b, and 46c, shown outlined in dashed-line rectangles in FIG. 4. Each frame storage circuit 46a, 46b, and 46c uses photosensing element 24 and provides a separate signal storage element 32, shown as a capacitor $C_{s1}$, $C_{s2}$, or $C_{s3}$ in the FIG. 4 embodiment, and an associated switching element 34, shown as a transistor $M_{s1}$, $M_{s2}$, or $M_{s3}$ for isolating its corresponding signal storage element 32. Each frame storage circuit 46a, 46b, and 46c also has a corresponding read-out switching element 26, shown as a transistor $M_{RO1}$, $M_{RO2}$, or $M_{RO3}$. Readout switching element 26 sends its signal along the data line to line buffers and amplifiers (not shown).

Charge or signal storage element 32 can be a capacitor such as a metal-insulator-metal capacitor or metal-insulator-semiconductor capacitor. Charge or signal storage element 32 could alternately be a transistor or diode. Examples of switching elements 26 include transistors as well as electromechanical relays and optically switched semiconductor switches.

Figure 5:
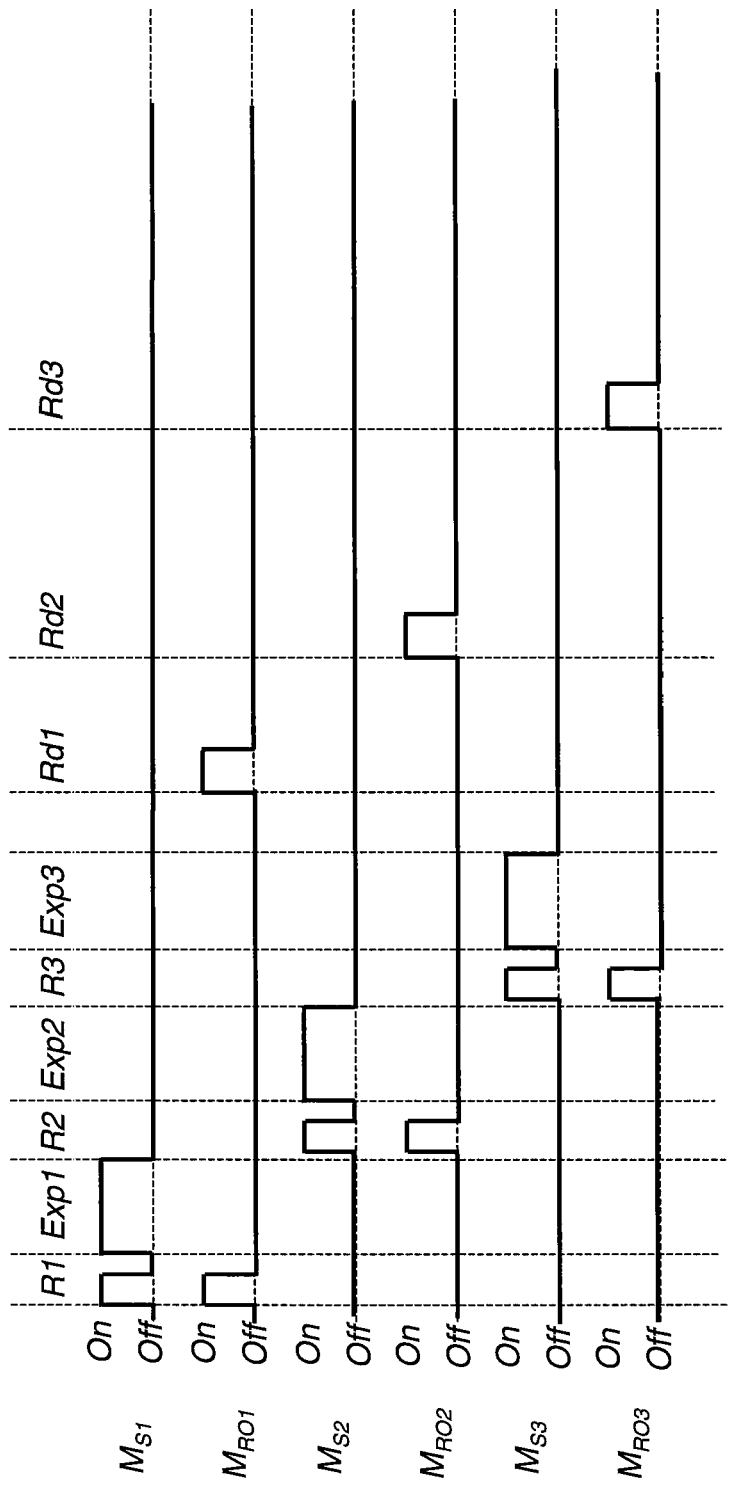
FIG. 5 is a timing diagram for obtaining multiple exposures using the embodiment of FIG. 4.

For each pixel 22, the sequence of operation for obtaining multiple images using the embodiment of FIG. 4 is as follows, and as illustrated in conjunction with the timing diagram of FIG. 5:

(i) Initial reset (R1). Photosensing element 24 (labeled PS) is reset to the data line potential by turning on both transistors $M_{S1}$ and $M_{RO1}$ simultaneously.

(ii) First exposure (Exp1). Just prior to the first exposure, transistor $M_{S1}$ is turned on, integrating the photocurrent on capacitor $C_{S1}$. Following the first exposure, transistor $M_{S1}$ is turned off.

(iii) Reset (R2). Photosensing element 24 is reset to the data line potential by turning on both transistors $M_{S2}$ and $M_{RO2}$ simultaneously.

(iv) Second exposure (Exp2). Just prior to the second exposure, transistor $M_{RO2}$ is turned off, allowing integration of the photocurrent on the second storage capacitor $C_{S2}$. Following the second exposure, transistor $M_{S2}$ is turned off.

(v) Reset (R3). Photosensing element 24 is reset to the data line potential by turning on both transistors $M_{S3}$ and $M_{RO3}$ simultaneously.

(vi) Third exposure (Exp3). Just prior to the third exposure, transistor $M_{RO3}$ is turned off, allowing integration of the photocurrent on the third storage capacitor $C_{S3}$. Following the third exposure, transistor $M_{S3}$ is turned off.

As can be appreciated, this exposure sequence can be continued for each utilized signal storage element 32 (in this example, capacitors $C_{S1}$, $C_{S2}$, $C_{S3}$ . . . ) within each frame storage circuit 46a, 46b, and 46c. Following the exposure sequence, read-out of the image data from image sensing array 44 can be performed. As shown in the schematic of FIG. 4 and the timing sequence of FIG. 5, readout of each frame storage circuit 46a, 46b, 46c is performed by turning on its corresponding readout transistor $M_{S1}$, $M_{S2}$, $M_{S3}$ . . . and sensing the corresponding signal charge on the dataline. This feature enables a relatively high readout rate. DR arrays can have typical readout times near about 1.0 second. With DR imaging apparatus 10 of the present invention, it is possible to obtain images at a faster rate, so that the time between image capture is less than the readout time. This capability can be used, for example, to obtain images from different view angles or even where an object undergoes some motion between image captures. Once images have been obtained using the method and apparatus of the present invention, image data content can be combined to form a composite image, such as a 3-D image, for example.

Figure 6:
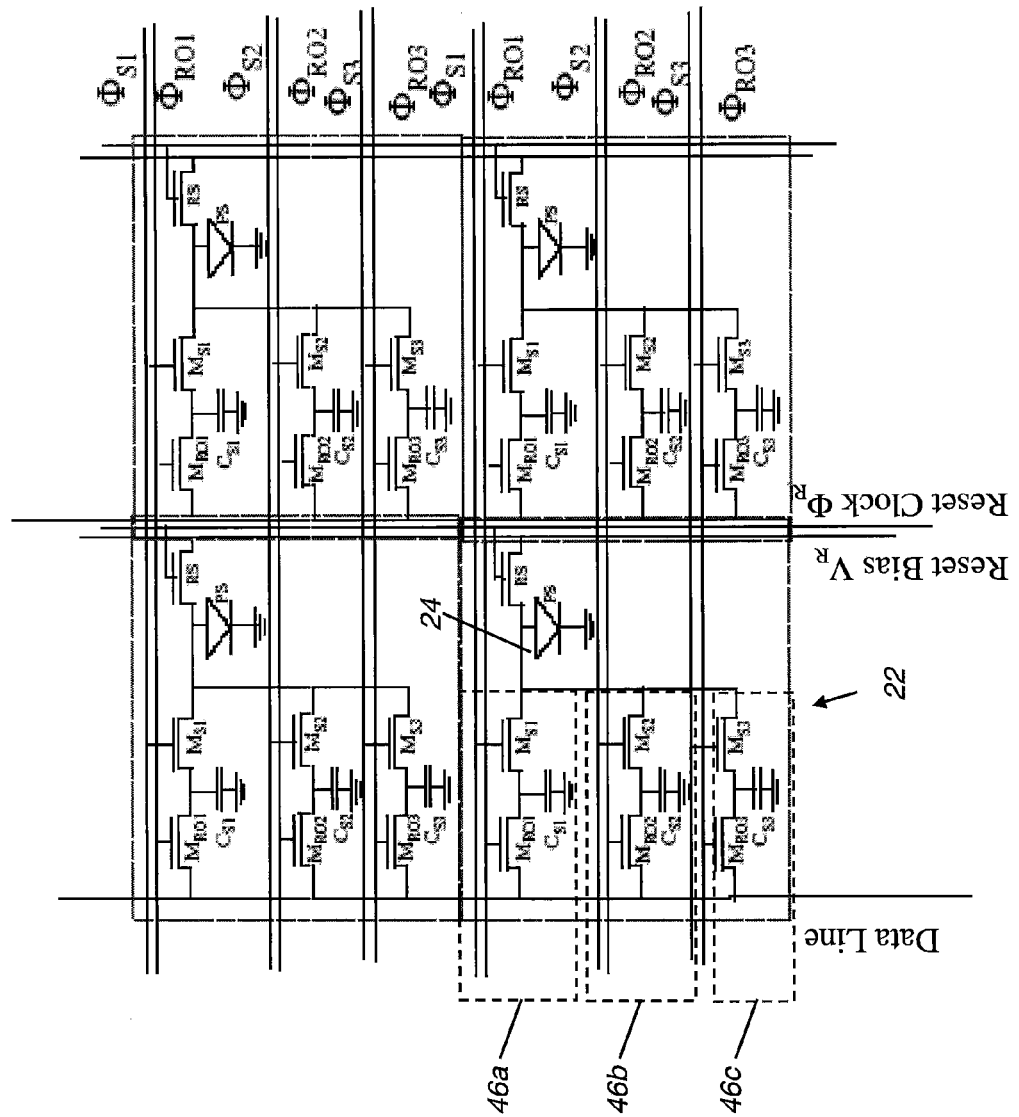
FIG. 6 is a schematic diagram showing an embodiment for multiple exposures having a separate refresh switch in each pixel site.
Figure 7:
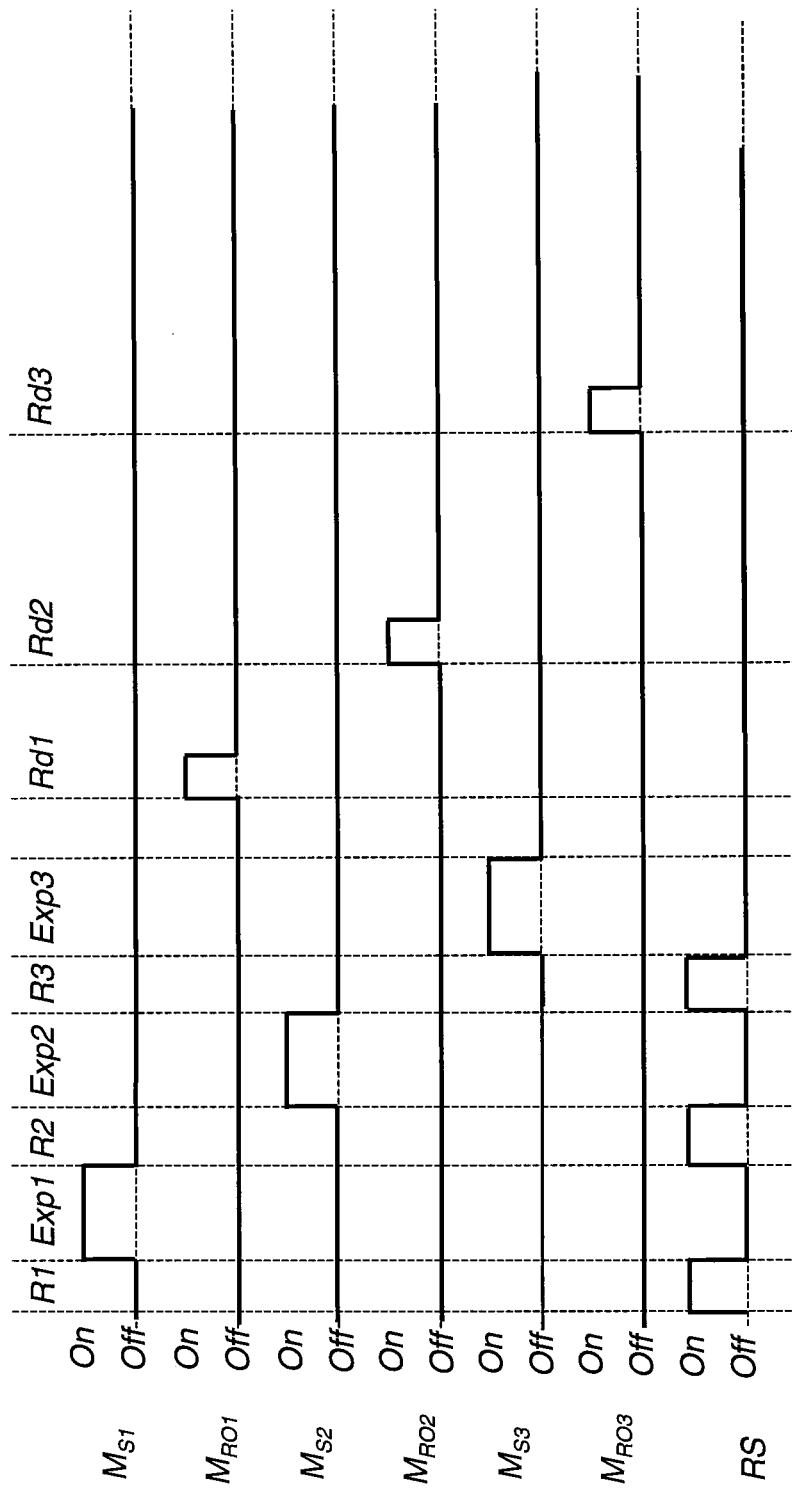
FIG. 7 is a timing diagram for obtaining multiple exposures using the embodiment of FIG. 6.

The alternate embodiment shown in the schematic diagram of FIG. 6 employs a similar circuit arrangement to that of the FIG. 4 embodiment, with the addition of a separate reset switch RS, typically a transistor component, as shown. The use of reset switch RS to set photosensing element 24 to a reset level helps to reduce the overall time required to reset photosensing element 24 (PS). The timing sequence for the FIG. 6 embodiment is shown in FIG. 7. A quick comparison of FIGS. 5 and 7 shows how reset timing is executed using reset switch RS in this alternate embodiment. In the FIG. 6 embodiment, reset periods R1, R2, and R3 are obtained by simply turning reset switch RS on for a sufficient time, using the reset clock $\Phi_R$ signal, to restore the reset bias voltage $V_R$ to photosensing element 24.

Beam-Triggered Readout

The basic architecture of the embodiments shown in FIGS. 3, 4, and 6 can be used in embodiments that capture images automatically under suitable conditions. Referring to the schematic diagram of FIG. 8, there is shown a schematic diagram of an embodiment that provides automatic image detection, using one frame storage circuit 46 per photosensing element 24. An amplifier 48 on each data line is used to sense and amplify the signal obtained from photosensing element 24. The timing diagram of FIG. 9 shows the sequence for controlling transistors $M_{RO}$ and $M_S$ when automatic capture is used.

Figure 8:
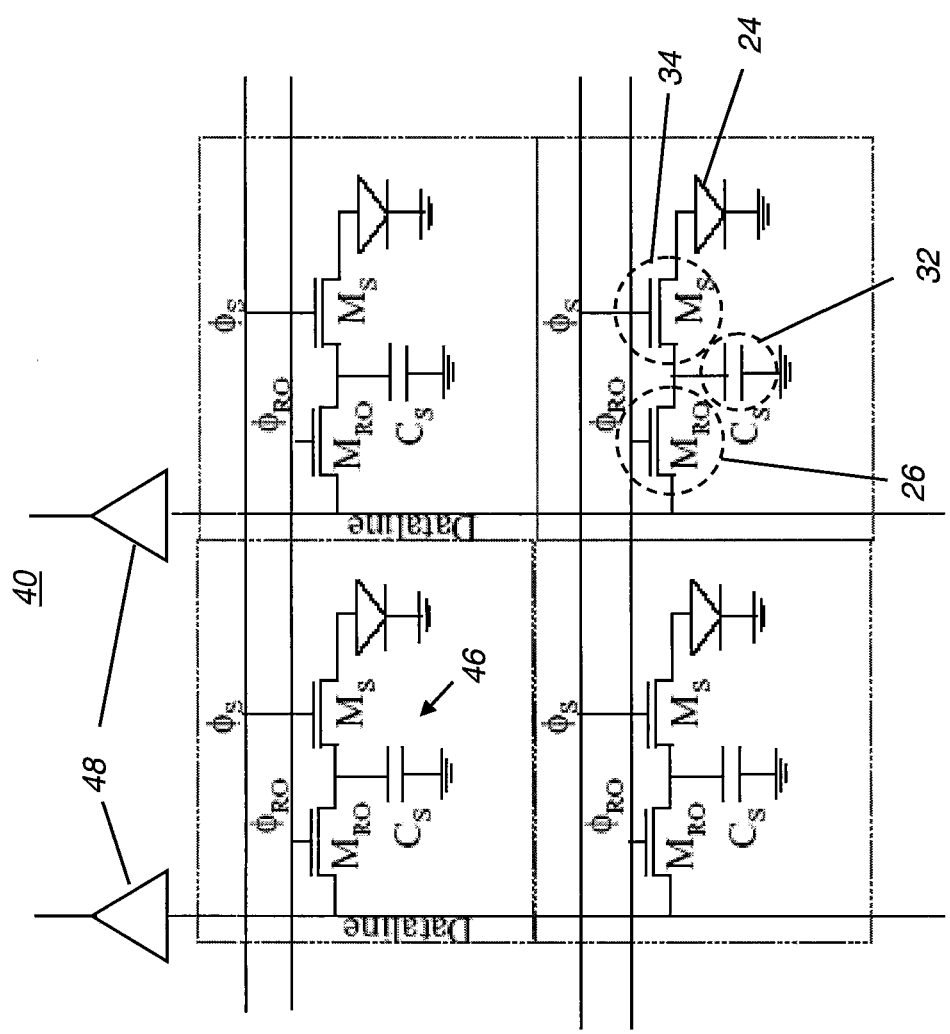
FIG. 8 is a schematic diagram showing an embodiment of the present invention adapted for automatic sensing and image capture initiation.
Figure 9:
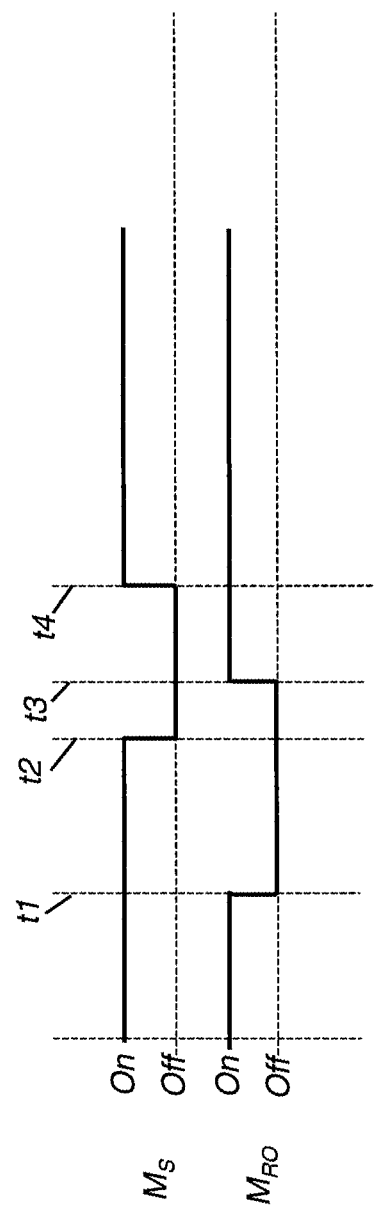
FIG. 9 is a timing diagram for the pixel control sequence when using automatic sensing and image capture initiation.

Still referring to FIGS. 8 and 9, both transistors $M_{RO}$ and $M_S$ are on until a time t1. At time t1, control circuitry (not shown but familiar to those skilled in the imaging arts) has detected the presence of a signal across photosensing element 24, at a level indicating that incident radiation has been received. Transistor switch $M_{RO}$ is then turned off to allow integration of the signal on corresponding capacitor $C_S$. At time t2, signal integration is complete and transistor switch $M_S$ turns off. Read-out can then occur at some later time t3, by switching on transistor switch $M_{RO}$. Reset occurs at time t4, with transistor switch $M_S$ turned back on.

Pixel-Level Signal Processing

Embodiments of the present invention provide a number of capabilities for improved image processing. Among these is the capability for dark current compensation.

Dark current is caused by the unwanted generation of charge carriers in photosensing element 24 from X-rays and various noise sources. Dark current exhibits time and temperature dependence and can also vary spatially over the area of an image-sensing array. Conventional methods for dark current compensation include taking benchmark measurements for unexposed pixels at the beginning or at the end of an imaging session, or for pixels outside the main imaging area, then subtracting these benchmark data from the signal data. However, it is well appreciated that such methods fall short of what is needed for dark current compensation in practice, since these methods can employ averaging and other techniques that compromise data integrity and tend to overlook differences in response between individual photosensing components.

By comparison with existing sensing array designs, the apparatus of FIGS. 4 and 6 of the present invention are advantaged for dark current measurement, since this effect can be measured at each individual photosensing element. For example, referring to FIG. 4, frame storage circuit 46a is used to detect dark current generated from photosensing element 24 during a period where there is no radiation exposure. Image data is then obtained by frame storage circuits 46b and 46c. The dark current data obtained from frame storage circuit 46a can then be subtracted from data values stored at frame storage circuits 46b and 46c.

Figure 10:
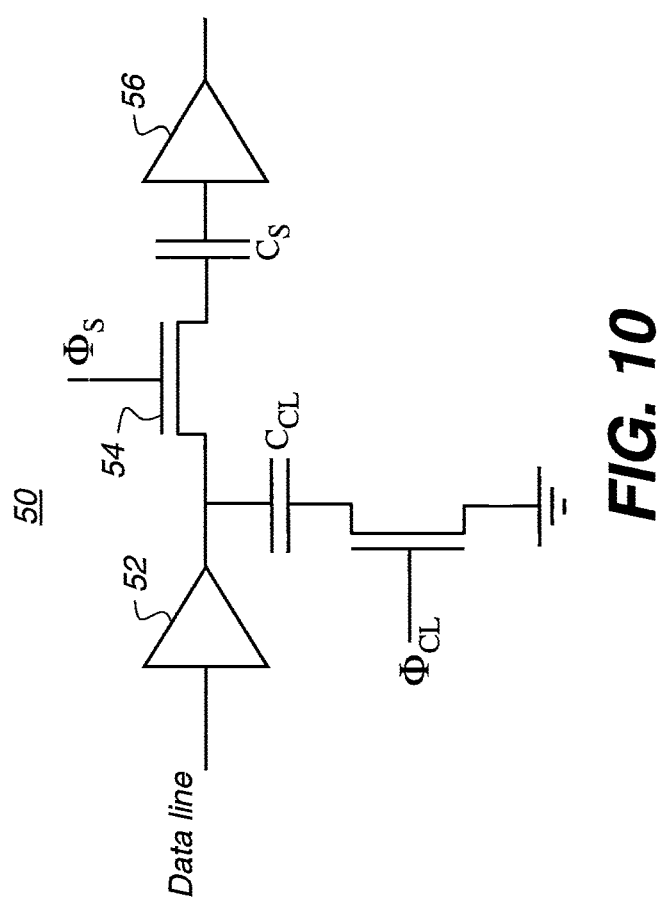
FIG. 10 is a schematic for a typical clamp and sample circuit.

Subtraction for dark current compensation can be performed directly within pixel 22 circuitry or can be performed at a charge amplifier that is switched to the data line for reading out sensed values. Referring to FIG. 10, there is shown a clamp circuit 50 that temporarily holds the dark current value, stored in capacitor $C_{CL}$. when switched to the data line through an amplifier 52. A sample signal $\Phi_S$ turns on a transistor switch 54 to direct this signal-to-signal line capacitor $C_S$. for subtraction at an amplifier 56.

Another method for improved signal processing relates to edge detection. The difference between values obtained at adjacent pixels 22 can be used to enhance edge sensing.

Figure 1:
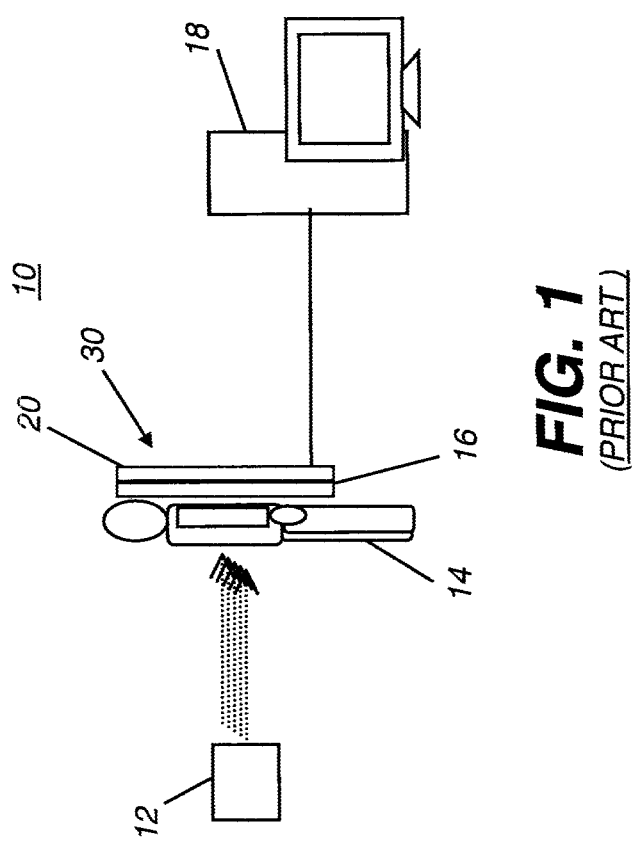
FIG. 1 is a simplified block diagram of a DR imaging system.
Figure 2:
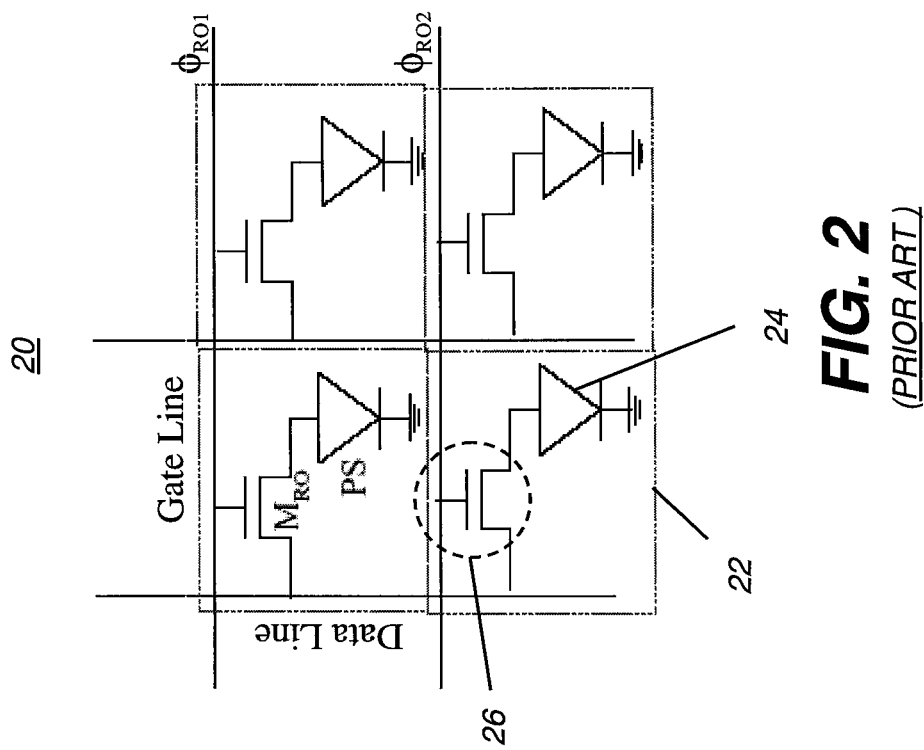
FIG. 2 is a schematic diagram showing pixel sites on an imaging array.

Referring back to FIG. 1, image-sensing array 40 or 44 of the present invention can be used to replace conventional image sensing array 20 in an embodiment of radiation detector 30, without requiring any change to scintillator screen 16 or radiation source 12 or other components of the DR imaging system. The control logic on control logic processor 18 may be modified in order to take advantage of new capabilities, such as the dark noise compensation noted earlier.

Figure 11:
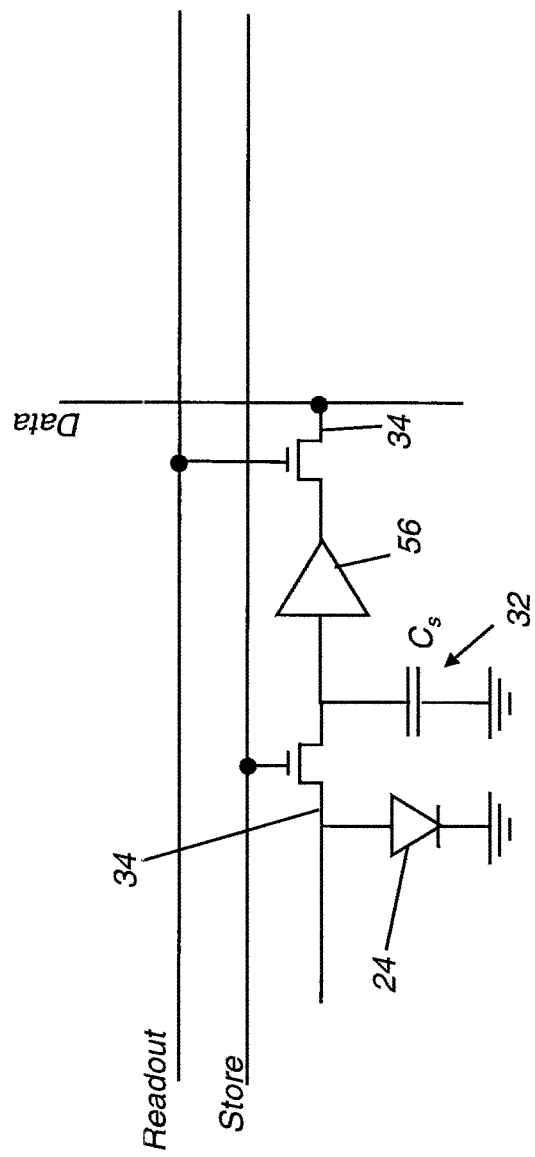
FIG. 11 is a schematic diagram of an embodiment using a readout element that includes both amplifier and switching element.
Figure 12:
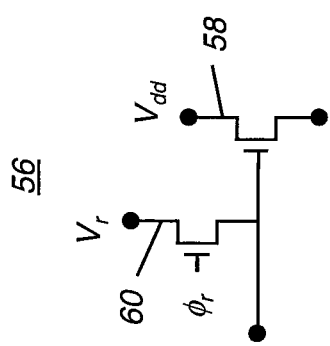
FIG. 12 shows an amplifier in one embodiment.

FIG. 11 shows a schematic diagram of an embodiment using a readout element that includes both amplifier 56 and switching element 34. Here, amplifier 56 can be used to buffer or to amplify the signal from signal storage element 32. Switching element 34 is a storage switch in this embodiment. FIG. 12 shows an amplifier 56 in one embodiment. Here, a first transistor 58 switches supply voltage $V_{dd}$. A second transistor 60 switches a reset voltage Vr upon receipt of a reset clock signal $\phi_r$.

Figure 13:
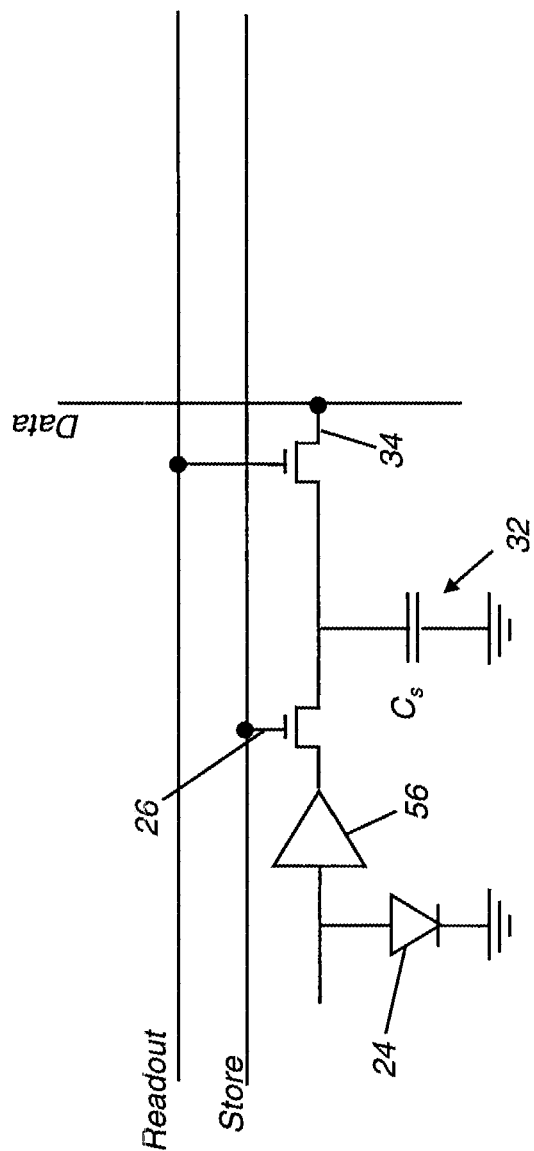
FIG. 13 shows an alternate embodiment for a storage switch readout element that supports a signal storage element.

FIG. 13 shows an alternate embodiment for a storage switch and readout element that supports signal storage element 32. Here, the readout element is switching element 34, a transistor. A storage switch is provided by the combination of transistor switch 26 and amplifier 56.

Figure 14:
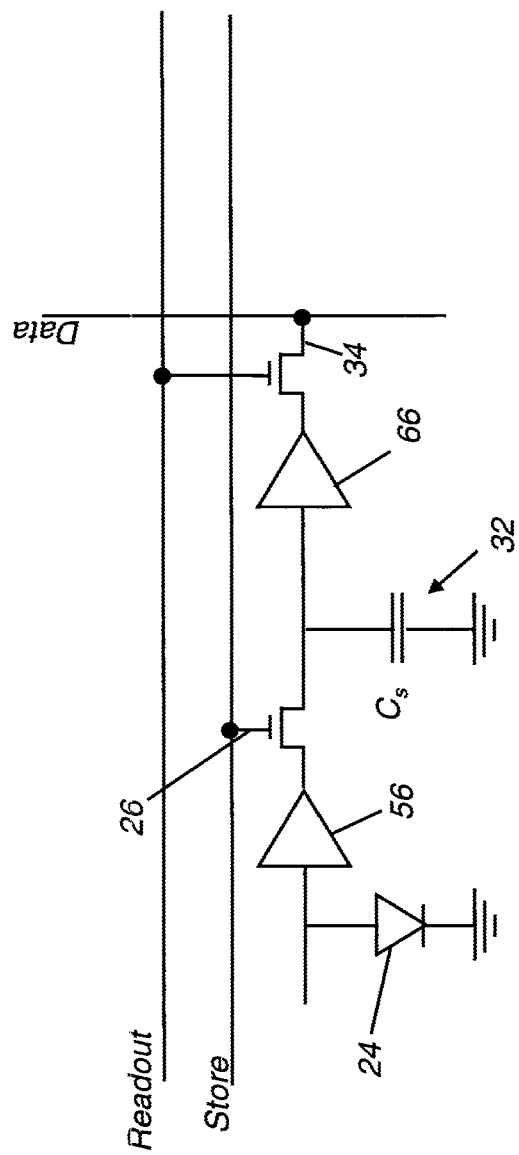
FIG. 14 shows another embodiment that combines readout and storage switch approaches used in FIGS. 11 and 13.

FIG. 14 shows another alternate embodiment, combining readout and storage switch approaches used in FIGS. 11 and 13. Here, a second amplifier 66 is used as part of the readout element, similar to the arrangement used in FIG. 11. Amplifier 56 is part of a storage switch, similar to its use as shown in FIG. 13.

One application of DR imaging apparatus 10 of the present invention relates to obtaining an image from an imaging apparatus having more than one scintillator phosphor screen. For such an embodiment, one charge storage element would be used to store the imaging signal obtained from a first scintillator phosphor screen, another charge storage element would be used to store the imaging signal obtained from a second scintillator phosphor screen. Exposures would be performed at different time periods, so that each corresponding charge storage element can obtain the necessary image signal.

Using multiple scintillator layers in a DR imaging plate can help to maximize the somewhat conflicting requirements for improved signal-to-noise ratio (SNR) and improved modulation transfer function (MTF). For such an application, a scintillating phosphor screen of a first thickness may be relatively thinner than a scintillating phosphor screen of a second thickness. With inherently less scattering, the first scintillating phosphor screen may be optimized for resolution and MTF. The thicker scintillating phosphor screen can be optimized for SNR. In another embodiment, multiple images may be obtained from separate phosphor screens in order to increase the dynamic range of the output image. Separate images can be obtained at different radiation energy levels.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, sensing, switching, and storage components within each pixel can be designed using any of a number of possible types and configurations. Photosensing element 24 can be a photodiode or other light-sensing component that provides an output signal according to incident radiation received. While descriptions and illustrations address problems and uses in digital radiography, the apparatus and methods of the present invention may be used in other imaging applications as well, including industrial imaging and other sensing applications.

Thus, what is provided is an imaging array apparatus for providing multiple radiographic images with reduced noise.

PARTS LIST

10 DR imaging apparatus
12 radiation source
14 subject
16 scintillator screen
18 control logic processor
20 image sensing array
22 pixel
24 photosensing element
26 switching element
30 radiation detector
32 signal storage element
34 switching element
40 image sensing array
44 image sensing array
46 frame storage circuit
46a frame storage circuit
46b frame storage circuit
46c frame storage circuit
48 amplifier
50 clamp circuit
52 amplifier
54 switch
56 amplifier
66 amplifier
58 transistor
60 transistor

The invention claimed is:

1. An x-ray imaging array comprising a plurality of pixel sites, each pixel site comprising:
   a) at least one photosensing element providing a variable signal in response to incident radiation;
   b) a first frame storage circuit electrically coupled to the photosensing element, wherein the first frame storage circuit comprises:
   (i) a first charge storage element for storing, in response to a first incident radiation in a first exposure period, a first signal provided by the photosensing element;
   (ii) a first switching element disposed to switch an electrode of the photosensing element to the first frame storage circuit; (iii) a second switching element including a first electrode connected to receive the signal stored in the first storage element and a second electrode, the second switching element disposed to switch the first charge storage element to a single signal readout element for reading the signal stored in the first charge storage element; and
   c) a second frame storage circuit electrically coupled to the photosensing element, wherein the second frame storage circuit comprises:
   (i) a second charge storage element for storing, in response to second exposure period, a second signal provided by the photosensing element;
   (ii) a third switching element disposed to switch an electrode of the photosensing element to the second frame storage circuit; (iii) a fourth switching element including a first electrode connected to receive the signal stored in the second storage element and a second electrode, the second switching element disposed to switch the second charge storage element to the single signal readout element for reading the signal stored in the second charge storage element; and
   a single signal readout element comprising:
   (i) a single sensing circuit for more than one pixel site, the single sensing circuit displaced from the plurality of pixel sites; and (ii) a data line extending from the single sensing circuit to the second electrode of each of the second switching elements and the fourth switching elements of the more than one pixel site.

2. The imaging array of claim 1 wherein at least one of the photosensing elements is a photodiode.

3. The imaging array of claim 1 wherein at least one of the first and second charge storage elements is a capacitor.

4. The imaging array of claim 1 wherein at least one of the switching elements is a thin-film transistor.

5. The imaging array of claim 1 wherein at least one of the switching elements comprises a thin film transistor and an amplifier.

6. The imaging array of claim 1 wherein the signal readout element comprises an amplifier and an additional data line.

7. The imaging array of claim 1 wherein at least one charge storage element comprises a clamp circuit for temporary storage of a signal level obtained from the charge storage element.

8. The imaging array of claim 1 wherein at least one switching element comprises an amplifier and a switch.

9. The imaging array of claim 1, further comprising sensing logic for sensing incident radiation received by the photosensing element and switching the first and second switching elements accordingly.

10. The imaging array of claim 1, wherein the first switching element and the second switching element are enabled to reset the at least one photosensing element to the dataline potential prior to the first exposure period, and wherein the third switching element and the fourth switching element are enabled to reset the at least one photosensing element prior to the second exposure period to the dataline potential.

11. The imaging array of claim 1, wherein the second signal of photosensing elements in the array is obtained without incident radiation directed to the x-ray imaging array representing a dark state signal thereby; reading out the second signal to the single sensing circuit; reading out the first image signal to the data line to condition the first image signal according to the second signal, for at least some of the photosensing elements in the x-ray imaging array, thereby compensating for dark state effect.

12. A radiographic imaging apparatus for capturing x-ray images of an object comprising:
   a) a radiation source to direct radiation, at a first wavelength, toward an object;
   b) a scintillation screen to receive radiation directed through the object and generate excited light having a second wavelength; and
   c) an imaging array, optically coupled to the scintillation screen and comprising a plurality of pixel sites, each pixel site comprising:
      (i) at least one photosensing element to provide a variable signal in response to incident radiation; and
      (ii) a plurality of frame storage circuits electrically coupled to the photosensing element, wherein each frame storage circuit comprises:
         (1) a charge storage element to store a signal provided by the photosensing element;
         (2) a first switching element disposed to switch an electrode of the photosensing element to the at least one frame storage circuit; and
         (3) a second switching element disposed to switch the at least one charge storage element from a first electrode connected to the charge storage element to a second electrode;
   d) a single signal readout element comprising a data line extending between more than one pixel site, the data line to directly connect from the second electrode of each of the second switching elements of the plurality of frame storage circuits to a single sensing circuit for the more than one pixel site, the single sensing circuit displaced from the imaging array,
   wherein each of the frame storage circuits is used to reset the at least one photosensing element to a potential of the data line by enabling the first switching element and the second switching element for a reset period before the signal provided by the photosensing element is stored by a corresponding charge storage element.

13. The imaging apparatus of claim 12 further comprising a control logic processor in communication with the imaging array for obtaining image data therefrom.

14. A method for operating a radiographic imaging apparatus for capturing a plurality of x-ray images of an object comprising:
   a) providing an array of photosensing elements, wherein each photosensing element provides a variable signal in response to incident radiation;
   b) providing a scintillation screen for receiving incident radiation at a first wavelength and responding by emitting excited radiation at a second wavelength;
   c) storing a first signal in a first charge storage element, for at least some of the photosensing elements in the array, wherein the first signal results from incident radiation directed to the scintillation screen, representing a first image signal thereby;
   d) storing a second signal in a second charge storage element at said at least some of the photosensing elements in the array, wherein the second signal results from incident radiation directed to the scintillation screen, representing a second different image signal thereby;
   e) storing a third signal in a third charge storage element at said at least some of the photosensing elements in the array, wherein the third signal results from incident radiation directed to the scintillation screen, representing a third different image signal thereby;
   f) reading out the first image signal to a first data line extending beyond the array of photosensing elements to a first sensing circuit displaced from the array of photosensing elements;
   g) sensing the first image signal from the first data line with the first sensing circuit displaced from the array of photosensing elements;
   h) reading out the second image signal to the first data line;
   i) sensing the second image signal from the first data line with the first sensing circuit
   j) reading out the third image signal to the first data line; and
   k) sensing the third image signal from the first data line with the first sensing circuit.

15. The method as in claim 14 further comprising combining image data content from at least the first and second image signals to form an image therefrom.

16. The method as in claim 14 wherein the first image signal and second image signal are obtained at different view angles.

17. The method as in claim 14 further comprising forming a composite view using both the first and second image signals.

18. The method as in claim 17 wherein the composite view is a 3-D view of an object.

19. The method as in claim 15 wherein combining the image data content enhances the dynamic range of the image.

20. The method as in claim 14 wherein the first image signal and second image signal are obtained at different incident radiation energy levels.

21. A method for operating a radiographic imaging apparatus for obtaining an x-ray image comprising:
   a) providing an array of pixel sites including photosensing elements, wherein each photosensing element provides a variable signal in response to incident radiation;
   b) providing a scintillation screen for receiving incident radiation at a first wavelength and responding by emitting excited radiation at a second wavelength;
   c) storing a first signal in a first charge storage element, for at least some of the photosensing elements in the array, wherein the first signal of photosensing elements in the array is obtained without incident radiation directed to the scintillation screen, representing a dark state signal thereby;

d) storing a second signal in a second charge storage element, for at least some of the photosensing elements in the array, wherein the second signal results from incident radiation directed to the scintillation screen, representing first image signal thereby;

e) reading out the dark state signal to a connected single sensing circuit displaced from the array of photosensing elements;

f) reading out the first image signal to the first data line; and g) conditioning the first image signal according to the dark state signal, for at least some of the photosensing elements in the array, thereby compensating for dark state effect.

22. The method of claim 21 further comprising, storing a third signal in a third charge storage element, for at least some of the photosensing elements in the array, wherein the third signal results from incident radiation directed to the scintillation screen, representing a second image signal thereby;

for each of the at least some of the photosensing elements in the array, turning on both first and second electronic switches momentarily to reset the photosensing elements;

reading out the second image signal to the first data line; and conditioning the second image signal according to the dark state signal, for the at least some of the photosensing elements in the array, thereby compensating for the dark state effect.

23. A method for operating a radiographic imaging apparatus for capturing a plurality of x-ray images of an object comprising:

providing an array of photosensing elements, wherein each photosensing element provides a variable signal in response to incident radiation;

providing a scintillation screen for receiving incident radiation at a first band of wavelengths and responding by emitting excited radiation at a second band of wavelengths;

resetting a plurality of photosensing elements to a data line potential before a first exposure by turning on both a-first switching elements and second switching elements, where the first switching elements are connected in series between a~a first data line and a-first charge storage elements, where the second switching elements are connected in series between the first charge storage elements and said each of the plurality of photosensing elements;

turning off the first switching elements upon sensing the start of the first exposure;

storing a first signal in the first charge storage elements for at least some of the photosensing elements in the array, wherein the first signal results from incident radiation directed to the scintillation screen during the first exposure, representing a first image signal;

resetting a plurality of photosensing elements to the data line potential before a second exposure by turning on both a-third switching elements and fourth switching elements, where the third switching elements are connected in series between the first data line and a-second charge storage elements, where the fourth switching elements are connected in series between the second charge storage elements each of the plurality of photosensing elements;

storing a second signal in the second charge storage element for said at least some of the of photosensing elements in the array, wherein the second signal results from incident radiation directed to the scintillation screen during the second exposure, representing a second image signal;

reading out the first image signal to the first data line extending beyond the array of photosensing elements to a first sensing circuit displaced from the array of photosensing elements;

sensing the first image signal from the first data line with the first sensing circuit displaced from the array of photosensing elements;

reading out the second image signal to the first data line; and sensing the second image signal from the first data line with the first sensing circuit.

24. The method of claim 23, wherein the storing the first signal in the first charge storage element is for substantially all of the photosensing elements in the array, and wherein the storing the second signal in the second charge storage element is for substantially all of the photosensing elements in the array, wherein the first exposure is obtained without incident radiation.

* * * * *

UNITED STATES PATENT AND TRADEMARK OFFICE
CERTIFICATE OF CORRECTION

| | | |
|---|---|---|
| PATENT NO. | : 8,558,929 B2 | Page 1 of 1 |
| APPLICATION NO. | : 11/613394 | |
| DATED | : October 15, 2013 | |
| INVENTOR(S) | : Timothy J. Tredwell | |

It is certified that error appears in the above-identified patent and that said Letters Patent is hereby corrected as shown below:

In the Claims:

| | |
|---|---|
| Column 13, Line 26, Claim 22 | Please replace the word "elements" with the word --element-- |
| Column 13, Line 43, Claim 23 | Please replace the word "a-first" with the word --first-- |
| Column 14, Line 1, Claim 23 | Please replace the words "a~a first data line and a-first" with the words --a first data line and first-- |
| Column 14, Line 4, Claim 23 | Please delete the word "said" |
| Column 14, Line 15, Claim 23 | Please replace the word "a-third" with the word --third-- |
| Column 14, Line 17, Claim 23 | Please replace the word "a-second" with the word --second-- |

Signed and Sealed this
Fifteenth Day of July, 2014

Michelle K. Lee
*Deputy Director of the United States Patent and Trademark Office*